(12) United States Patent
Zha et al.

(10) Patent No.: US 10,816,850 B2
(45) Date of Patent: Oct. 27, 2020

(54) DIRECT-LIT BACKLIGHT MODULE AND MANUFACTURING METHOD THEREOF

(71) Applicant: Wuhan China Star Optoelectronics Technology Co., Ltd., Wuhan (CN)

(72) Inventors: Guowei Zha, Wuhan (CN); Changwen Ma, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 13 days.

(21) Appl. No.: 16/097,275

(22) PCT Filed: Sep. 14, 2018

(86) PCT No.: PCT/CN2018/105611
§ 371 (c)(1),
(2) Date: Oct. 29, 2018

(87) PCT Pub. No.: WO2019/200825
PCT Pub. Date: Oct. 24, 2019

(65) Prior Publication Data
US 2019/0324322 A1    Oct. 24, 2019

(30) Foreign Application Priority Data

Apr. 20, 2018 (CN) .......................... 2018 1 0362823

(51) Int. Cl.
*G02F 1/13357* (2006.01)
(52) U.S. Cl.
CPC .. *G02F 1/133603* (2013.01); *G02F 1/133605* (2013.01); *G02F 1/133606* (2013.01)

(58) Field of Classification Search
CPC ......... G02F 1/133603; G02F 1/133605; G02F 1/133606
See application file for complete search history.

(56) References Cited

U.S. PATENT DOCUMENTS

2012/0248481 A1* 10/2012 Seo ...................... H01L 33/486
257/98
2013/0027633 A1* 1/2013 Park ......................... B32B 7/14
349/62

(Continued)

FOREIGN PATENT DOCUMENTS

| CN | 101004516 A | 7/2007 |
| CN | 101701693 A | 5/2010 |

(Continued)

*Primary Examiner* — John P. Dulka
(74) *Attorney, Agent, or Firm* — Leong C. Lei

(57) ABSTRACT

The present invention teaches a direct-lit backlight module and a related manufacturing method. The direct-lit backlight module includes a driver substrate, a reflection layer on the driver substrate, multiple mini-LEDs arranged in an array on the reflection layer, multiple reflection bumps on the reflection layer among the mini-LEDs, and an optical film set on the reflection layer, the mini-LEDs, and the reflection bumps. The mini-LEDs are electrically connected to the driver substrate. The reflection bumps jointly form a mesh dot structure. When light passes through the mesh dot structure, the light is scattered by the mesh dot structure to various directions, thereby enhancing the lighting efficiency of the direct-lit backlight module.

8 Claims, 3 Drawing Sheets

(56) References Cited

U.S. PATENT DOCUMENTS

| | | | |
|---|---|---|---|
| 2015/0369454 A1 | 12/2015 | Lee | |
| 2017/0194541 A1* | 7/2017 | Huang | H01L 33/62 |
| 2018/0080625 A1* | 3/2018 | Yamada | F21V 13/08 |
| 2019/0189595 A1* | 6/2019 | Lee | H01L 33/505 |
| 2019/0309913 A1* | 10/2019 | Yamamoto | F21K 9/64 |

FOREIGN PATENT DOCUMENTS

| | | |
|---|---|---|
| CN | 202469681 U | 10/2012 |
| CN | 104246360 A | 12/2014 |
| CN | 105334665 A | 2/2016 |
| CN | 105988243 A | 10/2016 |
| CN | 107703678 A | 2/2018 |
| CN | 107884987 A | 4/2018 |
| CN | 107908041 A | 4/2018 |

* cited by examiner

DIRECT-LIT BACKLIGHT MODULE AND MANUFACTURING METHOD THEREOF

FIELD OF THE INVENTION

The present invention is generally related to the field of display technology and more particularly to a direct-lit backlight module and a related manufacturing method.

BACKGROUND OF THE INVENTION

Liquid crystal display (LCD) is the mainstream display device and, due to its high quality, power efficiency, thin dimension, and high applicability, is widely applied to consumer appliances such as mobile phones, televisions, personal digital assistants, digital camera, notebook computers, desktop calculators, etc.

Existing LCD devices mostly include a LCD panel and a backlight module. The working principle of a LCD panel is placing liquid crystal molecules between two parallel glass substrates, and applying electricity through many vertical and horizontal wires on the substrates to alter the angles of the liquid crystal molecules, thereby refracting the light from the backlight module.

As the LCD panel itself does not self-illuminate, to display images on the LCD panel requires the light provided by the backlight module. Therefore, the backlight module is a key component to the LCD device. There are two types of backlight modules, depending on how light is incident into the LCD panel. The direct-lit backlight module has the light source, such as cold cathode fluorescent lamp (CCFL) tubes or light emitting diodes (LEDs) disposed behind the LCD panel. The light from the light source is scattered by a diffusion plate and becomes a planar light for the LCD panel.

As display technologies are continuously advanced, short bezel and full screen are the major product trends. Currently, the upper, left and right bezels of the LCD panel may be reduced to the minimum so as to satisfy the demand for full screen. The lower bezel however is difficult to reduce for the installation of driver chip and the edge-lit backlight module. Especially for edge-lit backlight module, a specific distance has to be reserved before the edge-lit backlight module so that its light may fully diffuse. The direct-lit backlight module does not suffer this limitation and therefore is widely applied to large-size display devices for its short bezel potential. However, direct-lit backlight module may increase the thickness of the display device. One of the resolutions is to use mini-LEDs, i.e., small LEDs whose dimension is around 100 microns. Using mini-LEDs in the backlight module may achieve short bezel without sacrificing the thickness of the LCD device.

On the other hand, similar to the edge-lit backlight module, mini-LED based direct-lit backlight module requires brightness enhancement film, reflection sheet, etc., to improve brightness. Currently, the most common brightness enhancement film converges most of the light towards a central region while the rest of the light is recycled into the light guide plate by total reflection. In contrast, mini-LED based direct-lit backlight module does not rely on the light guide plate to recycle light. Instead, the direct-lit backlight module has white reflective ink coated on the driver substrate to recycle light. Due to the ink's reflection property, the incident and reflected light usually has a common angle. The light is reflected either back into the brightness enhancement film to undergo total reflection, or to a low reflection area of the driver substrate (e.g., the surface of the mini-LEDs, the gap between the mini-LEDs and the ink) and lost. This would compromise the light recycle performance, causing a low lighting efficiency.

SUMMARY OF THE INVENTION

An objective of the present invention is to provide a direct-lit backlight module capable of enhancing light trajectory structure and lighting efficiency.

Another objective of the present invention is to provide a manufacturing method of a direct-lit backlight module where the direct-lit backlight module has enhancing light trajectory structure and lighting efficiency.

To achieve the above objectives, the present invention teaches a direct-lit backlight module, which includes a driver substrate, a reflection layer on the driver substrate, multiple mini-LEDs arranged in an array on the reflection layer, multiple reflection bumps on the reflection layer among the mini-LEDs, and an optical film set on the reflection layer, the mini-LEDs, and the reflection bumps. The mini-LEDs are electrically connected to the driver substrate.

The reflection layer includes multiple stacked dielectric layers having respective and different reflectivity. The reflection bumps are made of white reflective ink.

These mini-LEDs are respectively and electrically connected to the driver substrate through vias penetrating the reflection layer.

The driver substrate may be flexible printed circuit (FPC) substrate. The driver substrate includes a protection layer, a first conductive layer on the protection layer, a separation layer on the first conductive layer, and a second conductive layer on the separation layer. The mini-LEDs are respectively and electrically connected to the second conductive layer through multiple vias penetrating the reflection layer.

The optical film set includes a fluorescent film on the reflection layer, the mini-LEDs, and the reflection bumps, a diffusion film on the fluorescent film, and a brightness enhancement film on the diffusion film.

The present invention also teaches a manufacturing method for a direct-lit backlight module, which includes the following steps.

Step S1: providing a driver substrate and forming a reflection layer on the driver substrate;

Step S2: conducting a patterning process on the reflection layer and forming a plurality vias that penetrates the reflection layer;

Step S3: forming a plurality of mini-LEDs in an array on the reflection layer, where the mini-LEDs are respectively and electrically connected to the driver substrate through the vias;

Step S4: forming a plurality of reflection bumps at intervals on the reflection layer among the mini-LEDs; and Step S5: disposing an optical film set on the mini-LEDs, the reflection bumps, and the reflection layer.

The reflection layer includes multiple stacked dielectric layers having respective and different reflectivity. The reflection bumps are made of white reflective ink.

The reflection layer is formed in step S1 through a coating process. The reflection bumps are formed in step S4 through an ink-jet printing process.

The driver substrate may be a flexible printed circuit (FPC) substrate. The driver substrate includes a protection layer, a first conductive layer on the protection layer, a separation layer on the first conductive layer, and a second conductive layer on the separation layer. The mini-LEDs are respectively and electrically connected to the second conductive layer through multiple vias penetrating the reflection layer.

The optical film set includes a fluorescent film on the reflection layer, the mini-LEDs, and the reflection bumps, a diffusion film on the fluorescent film, and a brightness enhancement film on the diffusion film.

The advantages of the present invention is as follows. The present invention teaches a direct-lit backlight module. The direct-lit backlight module includes a driver substrate, a reflection layer on the driver substrate, multiple mini-LEDs arranged in an array on the reflection layer, multiple reflection bumps on the reflection layer among the mini-LEDs, and an optical film set on the reflection layer, the mini-LEDs, and the reflection bumps. The mini-LEDs are electrically connected to the driver substrate. The reflection bumps jointly form a mesh dot structure. When light passes through the mesh dot structure, the light is scattered by the mesh dot structure to various directions, thereby enhancing the lighting efficiency of the direct-lit backlight module. The present invention also teaches a manufacturing method of a direct-lit backlight module where the direct-lit backlight module has enhancing light trajectory structure and lighting efficiency.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures.

DETAILED DESCRIPTION OF PREFERRED EMBODIMENTS

The following descriptions for the respective embodiments are specific embodiments capable of being implemented for illustrations of the present invention with referring to appended figures.

Figure 1:
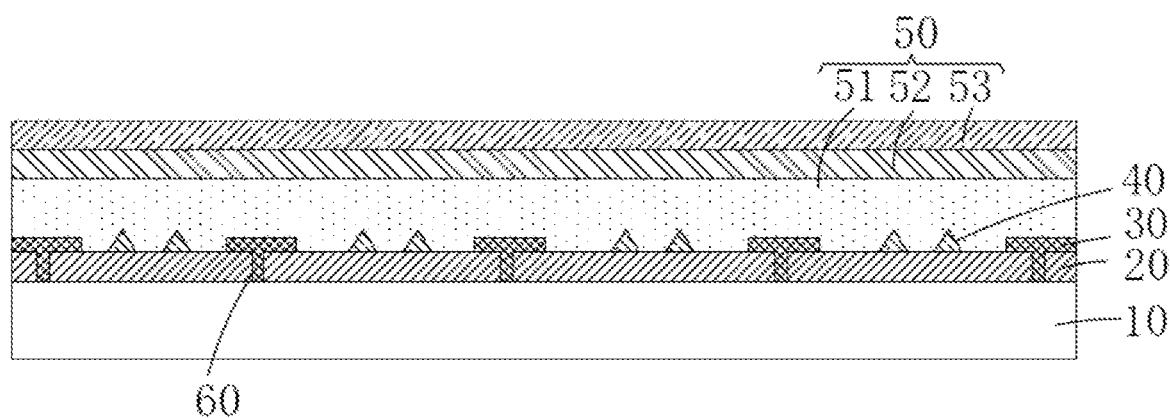
FIG. 1 is a schematic structural diagram showing a direct-lit backlight module according to an embodiment of the present invention.

As shown in FIG. 1, a direct-lit backlight module according to an embodiment of the present invention includes a driver substrate 10, a reflection layer 20 on the driver substrate 10, multiple mini-LEDs 30 arranged in an array on the reflection layer 20, multiple reflection bumps 40 at intervals on the reflection layer 20 among the mini-LEDs 30, and an optical film set 50 on the reflection layer 20, the mini-LEDs 30, and the reflection bumps 40. The mini-LEDs 30 are electrically connected to the driver substrate 10.

Specifically, these mini-LEDs 30 are respectively and electrically connected to the driver substrate 10 through vias 60 penetrating the reflection layer 20.

Specifically, the reflection layer 20 includes multiple stacked dielectric layers 21 having respective and different reflectivity. Through these dielectric layers 21, the reflection layer 20 has a greater reflectivity than that of the conventional white reflective ink. Specifically, the reflectivity of the reflection layer 20 is greater than 90%, and may be greater than 99%. For example, in some embodiments of the present invention, the reflection layer 20 includes a first dielectric layer and a second dielectric layer stacked together. The first and second dielectric layers have different reflectivity. Combing the first and second dielectric layers, the reflection layer 20 has an increased reflectivity.

Preferably, the reflection bumps 40 are made of white reflective ink.

It should be noted that these reflection bumps 40 jointly form a mesh dot structure. When light passes through the mesh dot structure, the light is scattered by the mesh dot structure to various directions or, specifically, the direct-lit backlight module. When the optical film set 50 reflects light towards the reflection layer 20, or the reflection layer 20 reflects light towards the optical film set 50, the light would be scattered by the mesh dot structure to various directions, thereby enhancing the lighting efficiency of the direct-lit backlight module.

Figure 2:
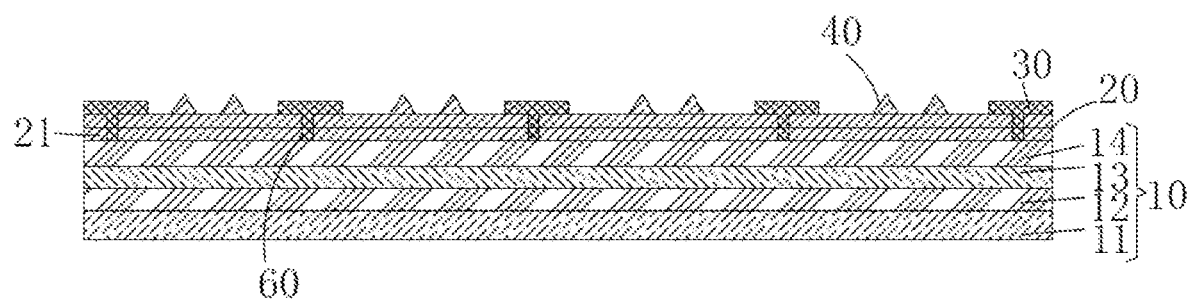
FIG. 2 is a schematic structural diagram showing a driver substrate of the direct-lit backlight module of FIG. 1.

Specifically, as shown in FIG. 2, the driver substrate 10 may be flexible printed circuit (FPC) substrate in some embodiments. The driver substrate 10 includes a protection layer 11, a first conductive layer 12 on the protection layer 11, a separation layer 13 on the first conductive layer 12, and a second conductive layer 14 on the separation layer 13. The mini-LEDs 30 are respectively and electrically connected to the second conductive layer 14 through multiple vias 60 penetrating the reflection layer 20. Preferably, the first and second conductive layers 12 and 14 are made of copper.

Of course, this is not a limitation to the present invention. In alternative embodiments, the driver substrate 10 may be printed circuit board (PCB) substrate.

Specifically, in some embodiments, the optical film set 50 includes a fluorescent film 51 on the reflection layer 20, the mini-LEDs 30, and the reflection bumps 40, a diffusion film 52 on the fluorescent film 51, and a brightness enhancement film 53 on the diffusion film 52. Preferably, the fluorescent film 51 includes transparent silicone and fluorescent powder particles.

Of course, this is not a limitation to the present invention. In alternative embodiments, the optical film set 50 may include other optical films such as wide viewing angle film.

The mini-LEDS 30 may include an electrode layer and a lighting layer on the electrode layer. The electrode layer is disposed on the reflection layer 20, and is electrically connected to the second conductive layer 14 of the driver substrate 10 through the vias 60. The electrode layer may be made of copper, silver, or aluminum, and preferably, silver or aluminum that has superior reflectivity.

Figure 3:
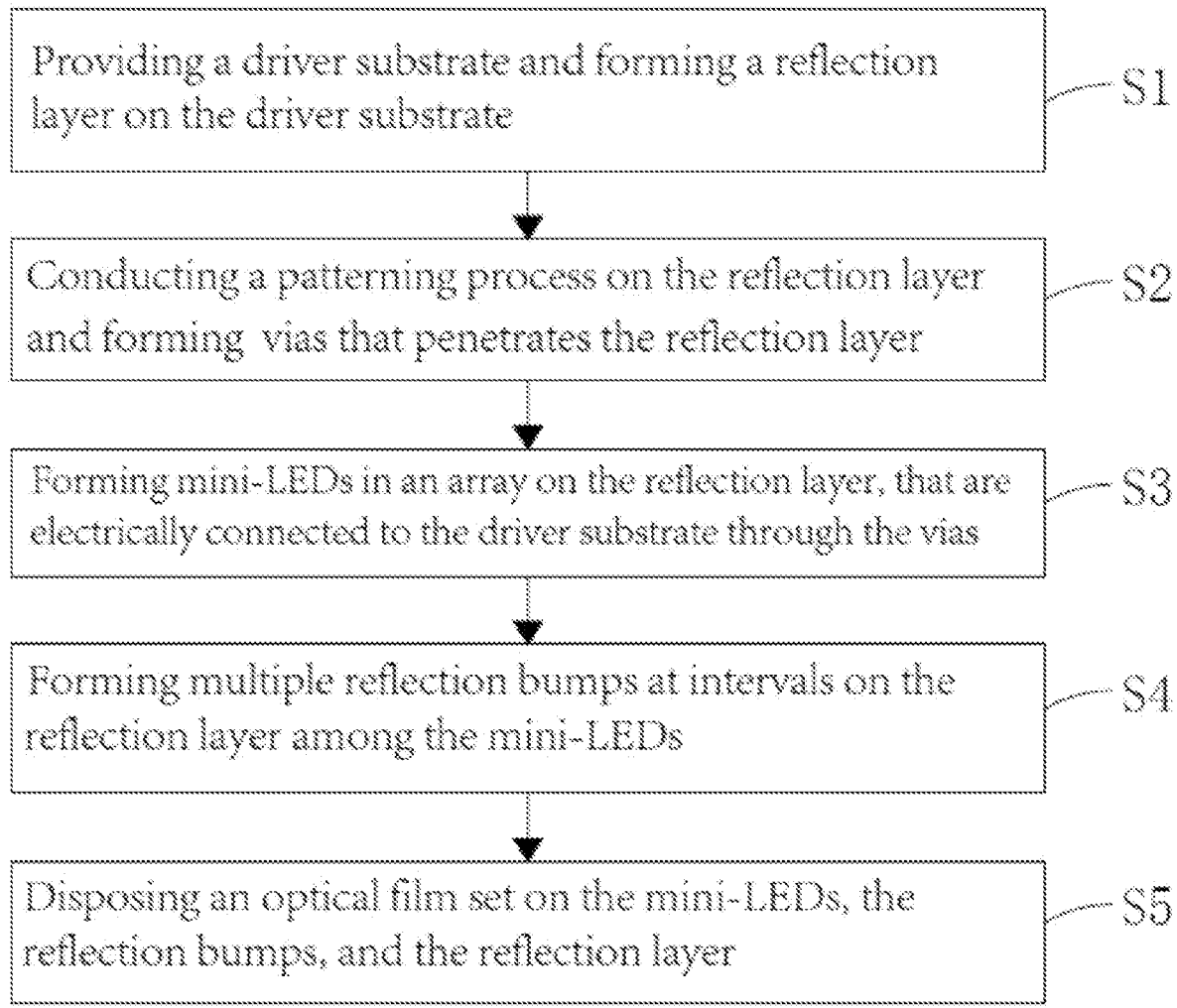
FIG. 3 is a flow diagram showing a manufacturing method of a direct-lit backlight module according to an embodiment of the present invention.

As shown in FIG. 3, the present invention teaches a manufacturing method for a direct-lit backlight module, which includes the following steps.

Step S1 provides a driver substrate 10 and forms a reflection layer 20 on the driver substrate 10.

Specifically, as shown in FIG. 2, the driver substrate 10 may be a flexible printed circuit (FPC) substrate in some embodiments. The driver substrate 10 includes a protection layer 11, a first conductive layer 12 on the protection layer 11, a separation layer 13 on the first conductive layer 12, and a second conductive layer 14 on the separation layer 13. Preferably, the first and second conductive layers 12 and 14 are made of copper.

Of course, this is not a limitation to the present invention. In alternative embodiments, the driver substrate 10 may be printed circuit board (PCB) substrate.

Specifically, the reflection layer 20 includes multiple stacked dielectric layers 21 having respective and different reflectivity. Through these dielectric layers 21, the reflection layer 20 has a greater reflectivity than that of the conventional white reflective ink. Specifically, the reflectivity of the reflection layer 20 is greater than 90%, and may be greater than 99%. For example, in some embodiments of the present invention, the reflection layer 20 includes a first dielectric layer and a second dielectric layer stacked together. The first and second dielectric layers have different reflectivity. Combining the first and second dielectric layers, the reflection layer 20 has an increased reflectivity.

Specifically, the reflection layer 20 is formed in step S1 through a coating process.

Step S2 conducts a patterning process on the reflection layer 20, forming multiple vias 60 penetrating the reflection layer 20.

Step S3 forms multiple mini-LEDs 30 in an array on the reflection layer 20. These mini-LEDs 30 are respectively and electrically connected to the driver substrate 10 through the vias 60.

Specifically, these mini-LEDs 30 are respectively and electrically connected to the second conductive layer 14 through the vias 60 penetrating the reflection layer 20.

The mini-LEDS 30 may include an electrode layer and a lighting layer on the electrode layer. The electrode layer is disposed on the reflection layer 20, and is electrically connected to the second conductive layer 14 of the driver substrate 10 through the vias 60. The electrode layer may be made of copper, silver, or aluminum, and preferably, silver or aluminum that has superior reflectivity.

Step S4 forms multiple reflection bumps 40 at intervals on the reflection layer 20 in the area among the mini-LEDs 30.

Specifically, the reflection bumps 40 are formed in step S4 through an ink-jet printing process.

Preferably, the reflection bumps 40 are made of white reflective ink.

It should be noted that these reflection bumps 40 jointly form a mesh dot structure. When light passes through the mesh dot structure, the light is scattered by the mesh dot structure to various directions or, specifically, the direct-lit backlight module. When the optical film set 50 reflects light towards the reflection layer 20, or the reflection layer 20 reflects light towards the optical film set 50, the light would be scattered by the mesh dot structure to various directions, thereby enhancing the lighting efficiency of the direct-lit backlight module.

Step S5 disposes an optical film set 50 on the mini-LEDs 30, the reflection bumps 40, and the reflection layer 20.

Specifically, in some embodiments, the optical film set 50 includes a fluorescent film 51 on the reflection layer 20, the mini-LEDs 30, and the reflection bumps 40, a diffusion film 52 on the fluorescent film 51, and a brightness enhancement film 53 on the diffusion film 52. Preferably, the fluorescent film 51 includes transparent silicone and fluorescent powder particles.

Of course, this is not a limitation to the present invention. In alternative embodiments, the optical film set 50 may include other optical films such as wide viewing angle film.

As described above, the present invention teaches a direct-lit backlight module, which includes a driver substrate, a reflection layer on the driver substrate, multiple mini-LEDs arranged in an array on the reflection layer, multiple reflection bumps on the reflection layer among the mini-LEDs, and an optical film set on the reflection layer, the mini-LEDs, and the reflection bumps. The mini-LEDs 30 are electrically connected to the driver substrate. The reflection bumps jointly form a mesh dot structure. When light passes through the mesh dot structure, the light is scattered by the mesh dot structure to various directions, thereby enhancing the lighting efficiency of the direct-lit backlight module. The present invention also teaches a manufacturing method for a direct-lit backlight module, where the backlight module has enhanced light trajectory structure and lighting efficiency.

Above are embodiments of the present invention, which does not limit the scope of the present invention.

What is claimed is:

1. A direct-lit backlight module, comprising a driver substrate, a reflection layer on the driver substrate, a plurality of mini-LEDs arranged in an array on the reflection layer and electrically connected to the driver substrate, a plurality of reflection bumps on the reflection layer among the mini-LEDs, and an optical film set on the reflection layer, the mini-LEDs, and the reflection bumps, wherein the reflection layer comprises a plurality of stacked dielectric layers having respective and different reflectivity; and the reflection bumps are made of white reflective ink.

2. The direct-lit backlight module according to claim 1, wherein the mini-LEDs are respectively and electrically connected to the driver substrate through a plurality of vias penetrating the reflection layer.

3. The direct-lit backlight module according to claim 2, wherein the driver substrate is a flexible printed circuit (FPC) substrate; the driver substrate comprises a protection layer, a first conductive layer on the protection layer, a separation layer on the first conductive layer, and a second conductive layer on the separation layer; the mini-LEDs are respectively and electrically connected to the second conductive layer through the vias penetrating the reflection layer.

4. The direct-lit backlight module according to claim 1, wherein the optical film set comprises a fluorescent film on the reflection layer, the mini-LEDs, and the reflection bumps, a diffusion film on the fluorescent film, and a brightness enhancement film on the diffusion film.

5. A manufacturing method of a direct-lit backlight module, comprising
  step S1: providing a driver substrate and forming a reflection layer on the driver substrate;
  step S2: conducting a patterning process on the reflection layer and forming a plurality vias that penetrates the reflection layer;
  step S3: forming a plurality of mini-LEDs in an array on the reflection layer, where the mini-LEDs are respectively and electrically connected to the driver substrate through the vias;
  step S4: forming a plurality of reflection bumps at intervals on the reflection layer among the mini-LEDs; and
  step S5: disposing an optical film set on the mini-LEDs, the reflection bumps, and the reflection layer;
  wherein the reflection layer comprises a plurality of stacked dielectric layers having respective and different reflectivity; and the reflection bumps are made of white reflective ink.

6. The method according to claim 5, wherein the reflection layer is formed in step S1 through a coating process; the reflection bumps are formed in step S4 through an ink-jet printing process.

7. The method according to claim 5, wherein the driver substrate is a flexible printed circuit (FPC) substrate; the driver substrate comprises a protection layer, a first conductive layer on the protection layer, a separation layer on the first conductive layer, and a second conductive layer on the separation layer; the mini-LEDs are respectively and electrically connected to the second conductive layer through the vias penetrating the reflection layer.

8. The method according to claim 5, wherein the optical film set comprises a fluorescent film on the reflection layer, the mini-LEDs, and the reflection bumps, a diffusion film on the fluorescent film, and a brightness enhancement film on the diffusion film.

\* \* \* \* \*